L. C. STURBELLE.
REVERSING MECHANISM FOR ROTATING SHAFTS AND THE LIKE.
APPLICATION FILED OCT. 27, 1919.

1,369,573.

Patented Feb. 22, 1921.
2 SHEETS—SHEET 1.

Inventor:
Lucien C. Sturbelle,
By Jno. E. Boulter,
Attorney

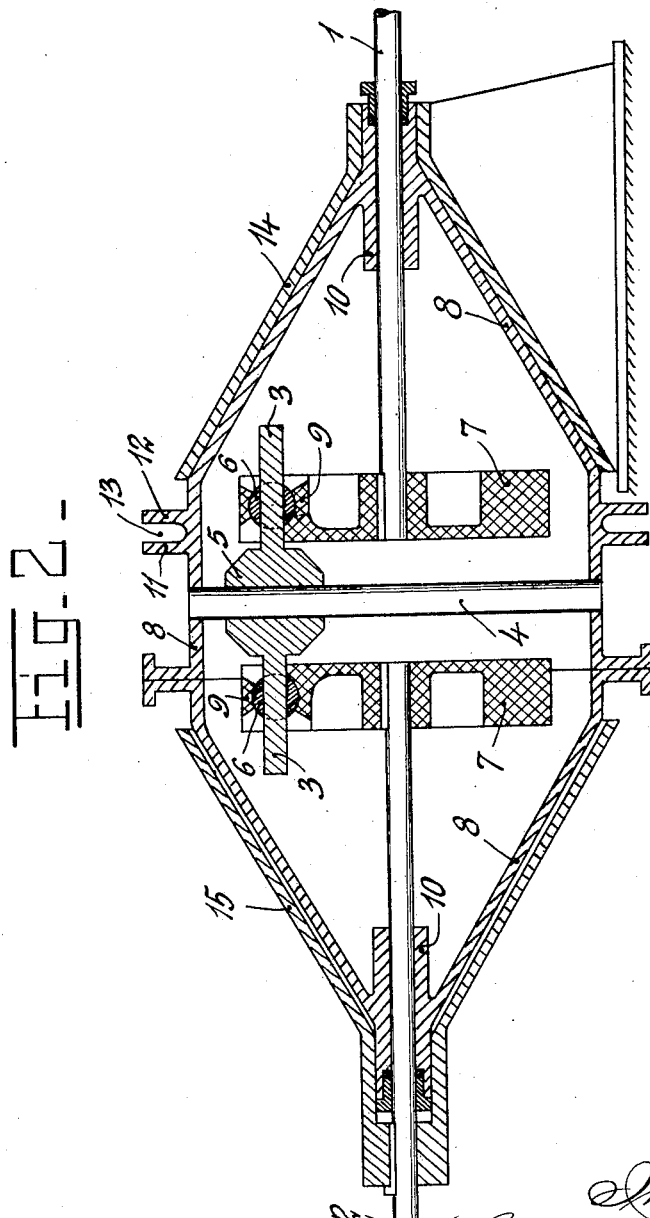

UNITED STATES PATENT OFFICE.

LUCIEN CHARLES STURBELLE, OF DRAMMEN, NORWAY.

REVERSING MECHANISM FOR ROTATING SHAFTS AND THE LIKE.

1,369,573. Specification of Letters Patent. Patented Feb. 22, 1921.

Application filed October 27, 1919. Serial No. 333,706.

*To all whom it may concern:*

Be it known that I, LUCIEN CHARLES STURBELLE, a Belgian subject, residing at "Nöstet," Drammen, Norway, have invented certain new and useful Improvements in Reversing Mechanism for Rotating Shafts and the like; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The usual reversing mechanism for rotary movements which comprises a bevel gear on each shaft both meshing with a third bevel gear has a number of disadvantages principally consisting therein, that the teeth cause a great deal of noise and are worn out in a comparatively short time.

The present invention has for its object a reversing mechanism operating without the use of gears, whereby the above mentioned disadvantages are entirely obviated.

The mechanism forming the subject matter of the present invention can be utilized as reversing gear for all kinds of rotary shafts and may be coupled so as to transmit the movement of the rotary shaft in both directions to another rotary shaft co-axial or not with the first mentioned shaft.

On the drawing:

Fig. 2 is a longitudinal section of the mechanism particularly adapted as reversing gear for an internal combustion engine, turbine or the like for motor cars, ships, winches, etc.

Figure 1:
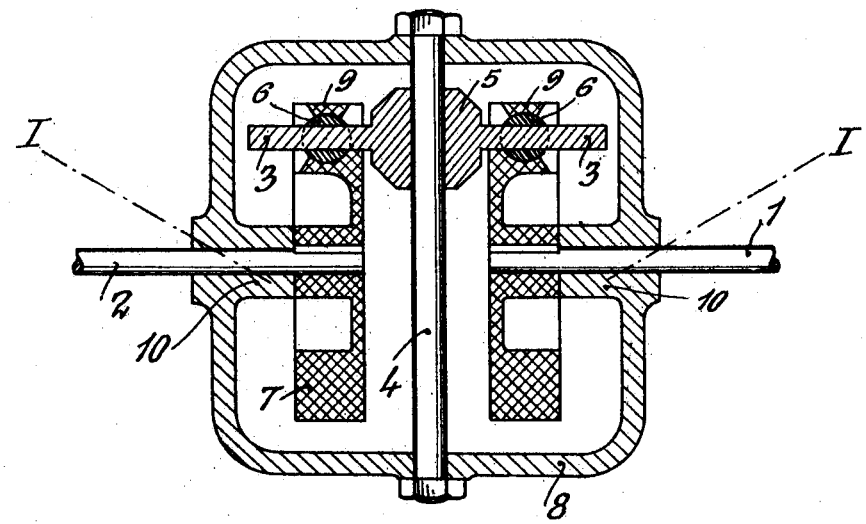
Figure 1 is a longitudinal section through a simple embodiment of the mechanism.

On Fig. 1, 1 indicates the driving shaft, which is supposed to rotate continuously in a certain direction. From said shaft the rotary movement is transferred to the co-axial driven shaft 2, so that the said shaft is rotated in the opposite direction in a similar manner. This according to the present invention is effected by means of a two-armed lever 3, which is slidably and pivotally mounted at its middle on a stationary rod 4 mounted transversely to the shafts 1 and 2. The two arms of the lever are slidably and rotatably connected with the two shafts at points which are eccentric with relation to the axes of rotation.

For this purpose arm 3 is provided with a central hub 5, which is adapted to slide and rotate on rod 4. The ends of said lever 3 slide in the spherical sleeves 6, which are inclosed in ball sockets 9 near the periphery of disks 7 mounted on the free ends of shafts 1, 2. The whole of this mechanism is inclosed in a tight casing 8, which may be filled with oil and which is provided with bearings 10, 10 for the inner ends of shafts 1, 2.

It will be understood that rotation of shaft 1 in one direction will cause by means of two-armed lever 3 a corresponding rotation in the opposite direction of shaft 2, said two-armed lever 3 thus oscillating on rod 4 and at the same time performing a sliding movement along the same.

Further it will be understood that all idle movements between the parts are obviated, and the parts of the mechanism exposed to wear are all simple parts of construction, which may be easily replaced.

The mechanism will act perfectly silent, particularly when inclosed in an oil casing as specified.

The mechanism can also be used when the two shafts form an angle between them, as indicated by the dotted lines I—I, and even in case the two shafts alter their relative position during the operation of the mechanism.

Even in this case both shafts will run absolutely synchronous in opposite direction, which is of considerable importance for transferring and reversing movements between two movable shafts.

The important condition is only that the movement is transferred by means of a two-armed lever, which is pivotally and slidably mounted at its middle on a stationary shaft, the axis of which divides in two equal parts the angle formed between the axes of the two rotating shafts, said lever having its two arms slidably and rotatably connected with the two shafts in points which are eccentric with relation to the axes of rotation.

If the mechanism shall be utilized as driving and reversing mechanism for motor cars, boats, winches and the like the form illustrated on Fig. 2 may suitably be made use of. Here the casing 8 is made in two parts which are connected by means of screws, and the casing is provided with two external ribs 11, 12 between which is formed an annular groove. In this groove is engaged in the usual manner a ring (not shown) connected with a forked lever for moving the casing axially with regard to the shaft.

The hubs 10 of the casing inclose the shafts 1, 2, and the external surface of the casing forms two oppositely directed conical members, each of which forms one element of a friction clutch, the other elements of which are formed respectively by a stationary conical sleeve 14 fastened to the frame chassis or hull and another conical sleeve 15 carried on shaft 2.

When the parts are in position shown on Fig. 2 the casing 8 is stationary owing to its right hand side being in engagement with the stationary sleeve 14. The movement from shaft 1 must therefore be transmitted by means of lever 3 to shaft 2, whereby the latter is driven in the opposite direction of shaft 1.

If casing 8 is now moved toward the left to the middle position, so that it is coupled with none of the slides 14, 15, casing 8 is then rotated by shaft 1 and rotates freely on shaft 2.

If the casing 8 is moved toward the left, until it is engaged with the sleeve 15, it will be stationary with regard to shaft 2, and in this position the casing in connection with the interior mechanism of the same serves only as a connection between the two shafts, which are then running in the same direction. As there are no teeth in the reversing mechanism, the movement of the shaft may be reversed almost instantaneously without risking breakage in order to effect a correct transmission.

Figure 3:
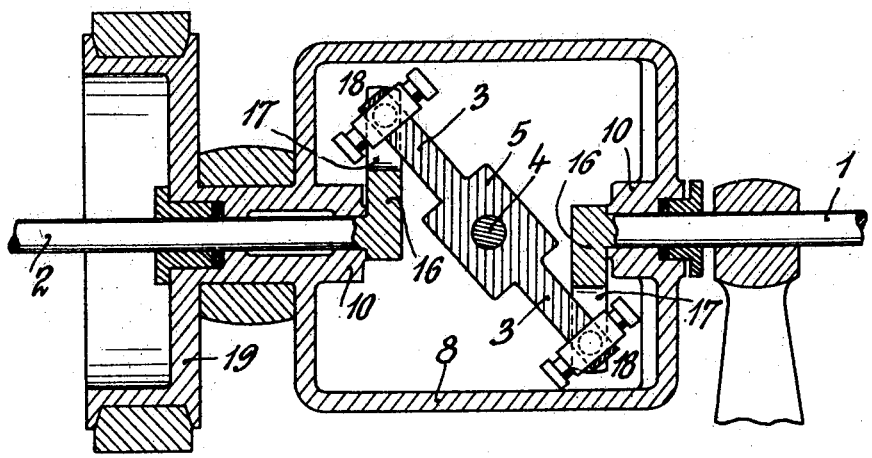
Fig. 3 is an axial longitudinal section through a modified form of the invention.

The mechanism may also be carried out as illustrated on Fig. 3. Here disks 7 are replaced by crank arms 16 with forks 17 connected by means of universal joints with arms 3, as indicated at 18, and instead of arranging the casing 8 to be axially slidable, it is provided with an extension comprising a friction disk 19 for a normal friction clutch, the exterior member of which is stationary, so that the casing 8 by means of this clutch may be made stationary or coupled to shaft 2.

Claims:

1. In a mechanism of the character described the combination with two rotatable shafts, of a rod arranged intermediate the adjacent ends of the shafts and transversely of the latter, a two-armed lever slidably and rotatably mounted at its center upon the said rod, means carried by the shafts and slidably and rotatably connecting the arms of the lever with said shafts at points which are eccentric with relation to the axes of rotation of the shafts, an inclosing casing slidably mounted upon the shafts and in which the said rod is mounted, a stationary element with which the casing is adapted to engage when said casing is moved in one direction, and a second element carried by one of the shafts, with which latter element the casing is adapted to engage when moved in the opposite direction.

2. In a mechanism of the character described, the combination with two rotatable shafts, of a rod mounted intermediate the adjacent ends of said shafts and transversely of the latter, a two-armed lever slidably and rotatably mounted at its center upon the said rod, disks mounted on the adjacent ends of the aforesaid shafts, a ball socket carried by each of the disks near the periphery thereof, spherical sleeves inclosed within the said sockets and through which slide the arms of the said lever, and an inclosing casing mounted on the aforesaid shafts, all arranged for coöperation substantially as described.

In testimony that I claim the foregoing as my invention, I have signed my name in presence of two subscribing witnesses.

LUCIEN CHARLES STURBELLE.

Witnesses:
  MOGENS BUGGE,
  LIGNE JOHNSEN.